(12) United States Patent
Thorson

(10) Patent No.: US 7,716,291 B2
(45) Date of Patent: May 11, 2010

(54) METHOD AND APPARATUS FOR A MESSAGE TARGETING AND FILTERING DATABASE SYSTEM

(76) Inventor: Joel Thorson, 7207 SW. 13th Ave., Portland, OR (US) 97219

( * ) Notice: Subject to any disclaimer, the term of this patent is extended or adjusted under 35 U.S.C. 154(b) by 1370 days.

(21) Appl. No.: 10/772,202

(22) Filed: Feb. 3, 2004

(65) Prior Publication Data
US 2005/0198151 A1    Sep. 8, 2005

(51) Int. Cl.
*G06F 15/16* (2006.01)

(52) U.S. Cl. ............... 709/206; 709/203; 709/217; 709/227; 709/232; 709/247; 726/26; 726/27; 726/2; 713/182; 713/184; 713/185; 713/189; 705/50; 705/57; 705/74; 705/76; 705/77; 707/9; 707/2

(58) Field of Classification Search ......... 709/203, 709/206, 217, 227, 232, 247; 726/26, 34, 726/23, 25, 27, 2; 707/10, 100, 2, 200, 9; 713/154, 182, 190, 184, 185, 189; 705/74, 705/79, 26, 27, 64, 3, 50, 57, 76, 77
See application file for complete search history.

(56) References Cited

U.S. PATENT DOCUMENTS

| | | | | |
|---|---|---|---|---|
| 6,029,195 A | * | 2/2000 | Herz | 725/116 |
| 6,151,643 A | * | 11/2000 | Cheng et al. | 710/36 |
| 6,650,890 B1 | * | 11/2003 | Irlam et al. | 455/412.1 |
| 6,934,838 B1 | * | 8/2005 | Boyce et al. | 713/156 |
| 7,054,906 B2 | * | 5/2006 | Levosky | 709/206 |
| 7,073,129 B1 | * | 7/2006 | Robarts et al. | 715/740 |
| 7,124,302 B2 | * | 10/2006 | Ginter et al. | 713/193 |
| 7,246,121 B2 | * | 7/2007 | Adar et al. | 707/9 |
| 7,277,695 B2 | * | 10/2007 | Petry et al. | 455/414.1 |
| 7,437,733 B2 | * | 10/2008 | Manzano | 719/315 |
| 7,451,218 B2 | * | 11/2008 | Malik et al. | 709/225 |
| 2003/0028451 A1 | * | 2/2003 | Ananian | 705/27 |

* cited by examiner

*Primary Examiner*—Nathan Flynn
*Assistant Examiner*—Mohammad A Siddiqi
(74) *Attorney, Agent, or Firm*—Ater Wynne LLP (57) ABSTRACT

A method and apparatus for a message targeting and filtering database system are provided to deliver bulk messages to demographically selected audiences of willing recipients while preserving each recipient's anonymity and control over his private personal data, accomplished by means of a radically distributed database technique in which all operations requiring unencrypted data access are distributed to individual client devices.

19 Claims, 5 Drawing Sheets

METHOD AND APPARATUS FOR A MESSAGE TARGETING AND FILTERING DATABASE SYSTEM

TECHNICAL FIELD

The present invention relates to the field of distributed databases. In particular, the present invention relates to a message targeting and filtering database system.

BACKGROUND

Internet marketing entails a central dilemma. Advertisers and fund-raisers require cost-effective bulk methods of disseminating messages. The effectiveness of bulk messaging is enhanced by the use of personal profiling information to narrow the scope of distribution to individuals deemed most likely to be receptive. Databases of such information are commonly rented and sold for use by third parties, and have accordingly become valuable financial assets. For individual subjects, these practices create issues of privacy, ownership and control over their personal information. Such concerns have been exacerbated by the explosive growth of networking technology, which accelerates the propagation of personal information via the Internet.

Bulk messaging explicitly requested by an individual subject is known as permission-based or "opt-in" messaging. Examples include "listserv" email lists allowing subjects to request notification regarding topics or events of interest, and World Wide Web (Web) sites which invite visitors to fill out forms identifying subject or product categories about which they would like to receive information. In other cases, the opt-in election may be less obvious, as when an opt-in check box is pre-checked by default, or when permission to send messages is embedded in a lengthy end-user license to which a subject must agree before using a product or service.

Unsolicited messaging methods include both legitimate ("opt-out") and illegitimate techniques, the latter commonly known as "spam." Unsolicited bulk messaging, while cost-effective, may have the effect of antagonizing its recipients, many of whom view it as "junk mail," don't read it, and may object to receiving it. Those who do read a particular message may bring to it a skeptical or even hostile attitude toward the product or service offered, the sender, or the messenger.

The opt-out model places the burden of diligence on the individual subject, who is deemed to have implicitly "opted in" merely by buying something on-line, opening an account, registering a warranty, filling out a preference survey, making a charitable donation, or posting a message to a news or discussion group. The organization collecting the information is presumed entitled not only to contact the subject at will, but to share her personal information with other organizations for profit, without explicit permission. The subject typically discovers after the fact that she has unknowingly opted in to a stream of unwanted messages from a variety of sources, and moreover has no way of tracing a given message back to a particular opt-in decision, or knowing who made money from the sharing of her personal information.

Typically, opt-out bulk messaging affords the subject a periodic opportunity to remove himself from a messaging database; however, opting out is often made difficult or inconvenient. Many consumers resent the burden of effort that the current opt-out system imposes on them, and most do not persist in opting out at every opportunity, given the great number of organizations and companies that typically have access to their personal information. Moreover, "spammers" are known to use opt-out responses as corroboration that the contact information is indeed current, and can be expected to exploit official "no-spam" lists the same way, given the opportunity.

Corporate privacy policies governing the use of opt-out contact information do not have the legal force of contracts, and can be changed by the marketing organization at will. Mergers, acquisitions, and financial exigency have led corporations to repudiate the privacy assurances under which consumers volunteered information. Bankruptcy proceedings result in the sale of customer databases and other contact lists to organizations which do not consider themselves accountable for the bankrupt company's privacy assurances and which are not held accountable under current law.

The decentralized and international nature of the Internet has spawned a huge and growing market in illicit personal information without the protection of privacy rules, opt-in, opt-out or otherwise. It is a relatively easy matter for organizations, particularly unregulated offshore companies, to use the so-called "dark Internet," including inadequately protected private computers, to bombard consumers with messages using contact information obtained surreptitiously, without fear of accountability.

What is needed is a means of (a) providing messaging access to a highly targeted audience of willing message recipients, while (b) securing each individual's privacy, selectivity, ownership, and financial participation in the use of his personal information, and (c) ensuring legal accountability when data access is mandated by a court of law. Such a system would serve not only individual interests but marketing interests as well, by reclaiming the message channel, enhancing the cost-effectiveness of targeted bulk messaging, and regaining the attention, participation and goodwill of customers, clients, consumers and contributors.

SUMMARY OF THE INVENTION

The invention is a message targeting and filtering system and method based on an extreme application of distributed database technology in which the central database service defines a uniform data format or "schema," but is otherwise relegated to a subordinate role in which it performs only storage and clearinghouse functions that do not require unencrypted data access. All database functions requiring unencrypted data access, including modification, querying and schema migration of data records, are delegated to client-side software agents deployed on devices under the personal control of individual database subjects. The invention contemplates various methods of data security and various methods of anonymous payments for message consumption by way of machine-executable medium storage media comprising instructions executed by a machine (alternatively referred to herein as machine-accessible medium comprising content that, when accessed by a machine, causes the machine to perform recited steps), e.g. classic computer software operating to specially alter or adapt a general-purpose computer to serve a special inventive purpose.

BRIEF DESCRIPTION OF THE DRAWINGS

The invention is illustrated by way of example in the figures of the accompanying drawings in which like reference numerals refer to similar elements, and in which.

DETAILED DESCRIPTION

In the following description, various aspects of the invention, A Method and Apparatus for a Message Targeting and Filtering Database System (MTFDBS), are described. In one embodiment MTFDBS is a radically distributed database system that provides for the delivery of bulk messages to demographically selected audiences while preserving each individual subject's anonymity and control over his own personal records. Specific details are set forth in order to provide a thorough description. However, it is understood that embodiments of the invention may be practiced with only some or all of these aspects, and with or without some or all of the specific details. In some instances, well-known features have been omitted or simplified in order not to obscure the understanding of this description. It is further understood that the various aspects of the method may or may not be carried out in the order they are presented. Also, repeated usage of the phrase "in one embodiment" does not necessarily refer to the same embodiment, although it may.

Figure 1:
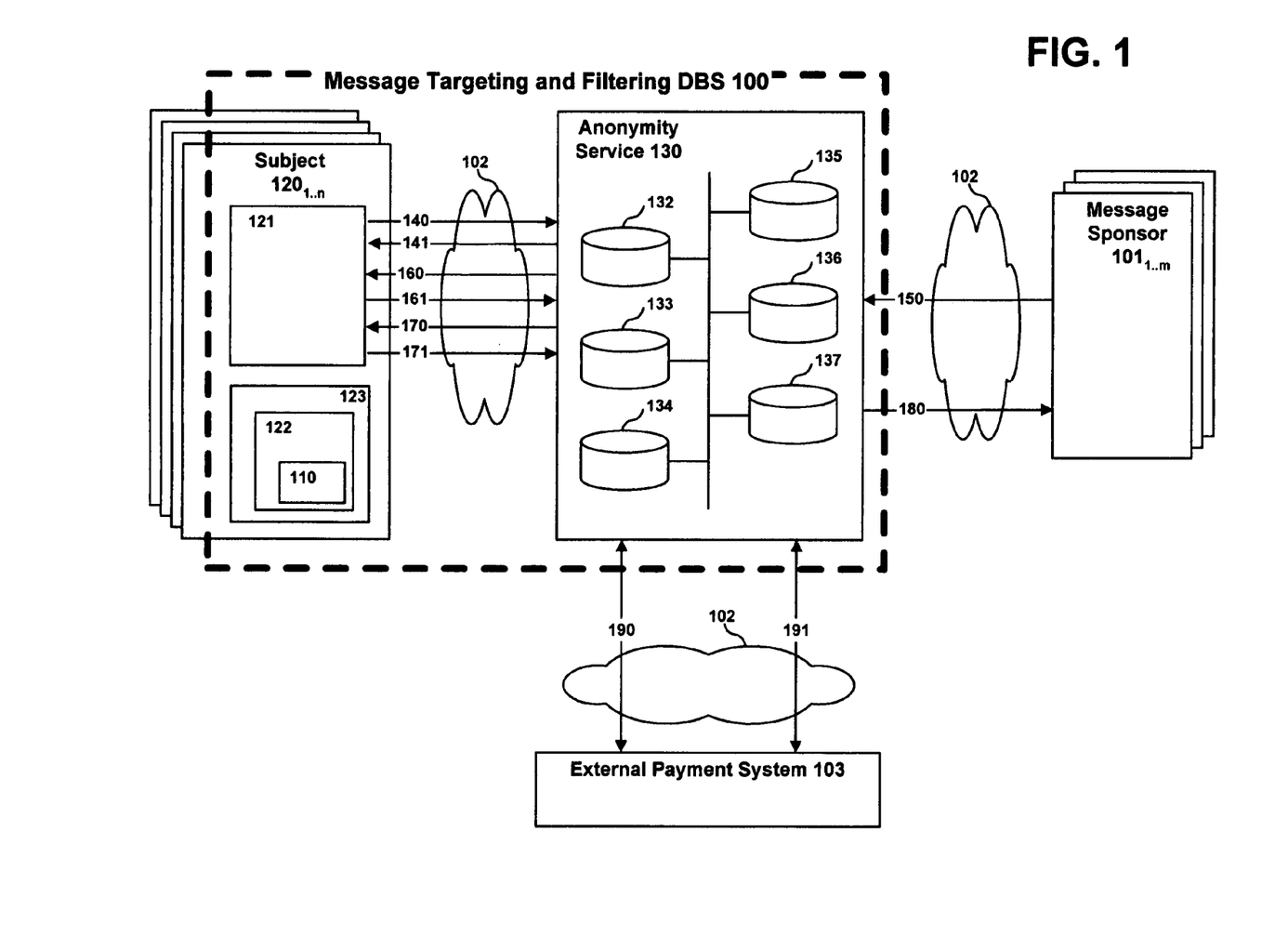
FIG. 1 is a block diagram of a client-server architecture within which the teachings of the invention can be practiced, in accordance with one embodiment of the invention.

FIG. 1 is a block diagram of a client-server architecture within which the teachings of the invention can be practiced. In one embodiment MTFDBS 100 is a distributed client-server database system consisting of Anonymity Service 130, a self-contained database service with distinct database responsibilities and client interactions, and two categories of clients: message sources and message recipients/self-profiling subjects. The message source clients are shown in FIG. 1 as Message Sponsor $101_{1\ldots m}$ to indicate that there may be one or many message sources. In the description below, Message Sponsor 101 refers to a message source for ease in description but does not limit the number or type of message sources. The message recipients/self-profiling subjects are shown in FIG. 1 as Subject $120_{1\ldots n}$ to indicate that there may be one or many message recipients/self-profiling subjects. In the description below, Subject 120 refers to an individual subject for ease in description but does not limit the number or type of message recipients/self-profiling subjects. MTFDBS 100 may have any number of message source clients and any number of message recipient/self-profiling subject clients. Any number of message sources may communicate through MTFDBS 100 to one or many subjects.

Anonymity Service 130 is the intermediary that delivers targeted messages from Message Sponsor 101 to all Subject 120 willing to receive them, returning confirmations enabling Message Sponsor 101 to be billed for message deliveries and Subject 120 to be reimbursed for message consumption, all the while preserving each Subject's 120 anonymity and data privacy. MTFDBS 100 achieves this by a radical and novel decentralization of the classic client-server database model.

The two categories of clients communicate directly with Anonymity Service 130 but not with each other except indirectly through Anonymity Service's 130 intermediation. Anonymity Service 130 communicates with Subject $120_{1\ldots n}$ and Message Sponsor $101_{1\ldots m}$ via Network 102.

Network 102 may be a private local-area network, a wide-area network, the Internet, or any other digital network, the transport mechanism for which may be Ethernet cable, optical fiber, infrared, wireless, or any other physical transport mechanism. Such communication means are well known in the art and will not be further discussed here except to note that the invention is not constrained to any particular type or mechanical means of communication.

Referring to FIG. 1, Message Sponsor 101 sends Message Deposit 150 to Anonymity Service 130. In one embodiment, Message Deposit 150 contains Message 150A accompanied by Message Targeting Specification 150B and Message Profile 150C characterizing Message 150A and its sender. Message Targeting Specification 150B is for use in directing Message 150A to an audience of particular interest, and may identify a specific recipient or recipients, or may describe a class of recipients in general demographic terms. Message Profile 150C contains information useful to recipients in deciding whether to accept Message 150A, including, for example, the type of message content, the reputation of the sender based on prior message feedback, a reimbursement offer for message acceptance, etc. Message Targeting Specification 150B and Message Profile 150C together comprise a database query expressed in terms of a uniform data format or "schema" specified by Anonymity Service 130.

Anonymity Service 130 stores Message Deposit 150 in Message Store Database 136 until delivery to all willing recipients Subject $120_{1\ldots n}$ is complete. Independently, as further described below in reference to FIG. 2, Subject 120 initiates a client session by sending Session Agent Download Request 140. Anonymity Service 130 responds with Session Agent Download 141, which equips Subject 120 with Personal Record 110 belonging specifically to Subject 120, and everything needed for performing database queries on Personal Record 110. Anonymity Service 130 sends Message Permission Query 160 to Subject 120. Subject 120 determines whether or not to accept the message by comparing information in Personal Record 110 against information contained in Message Permission Query 160, as described below in reference to FIG. 3. Based on the outcome of this query Subject 120 sends Message Permission Query Result 161 to Anonymity Service 130. If Message Permission Query Result 161 is positive, Anonymity Service 130 sends Message Delivery 170 to Subject 120, as described below with reference to FIG. 4. When Anonymity Service 130 receives Delivery Acknowledgement 171 from Subject 120, Anonymity Service 130 sends Delivery Notification 180 to Message Sponsor 101.

Figure 1A:
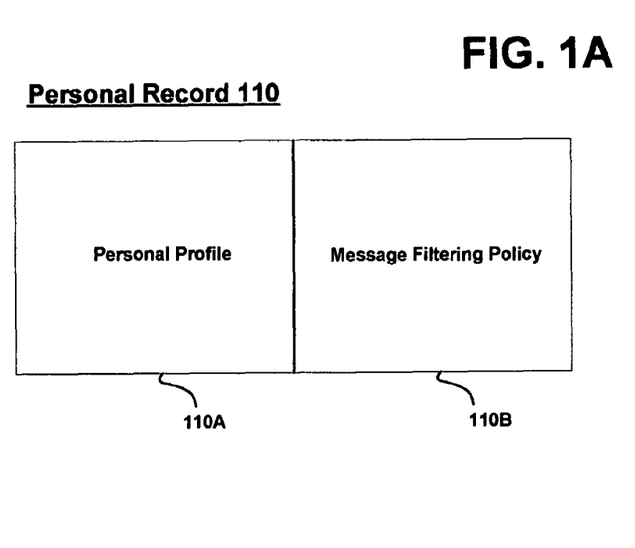
FIG. 1A is a block diagram of the components of a personal record in accordance with one embodiment of the invention.
Figure 1B:
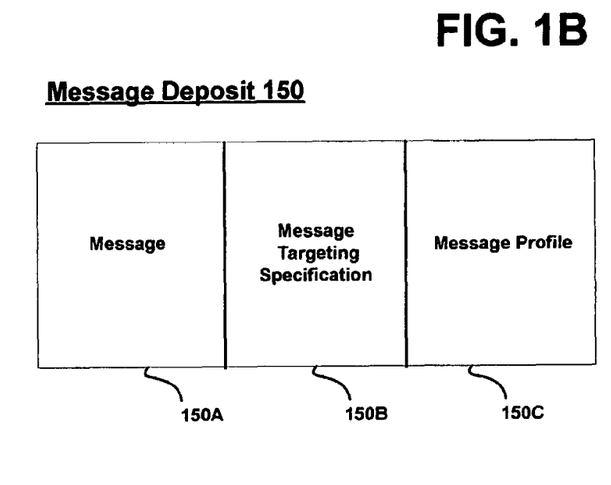
FIG. 1B is a block diagram of the components of a message deposit in accordance with one embodiment of the invention.

FIG. 1A is a block diagram of the components of a personal record in accordance with one embodiment of the invention. Personal Record 110 consists of a self-describing personal profile (Profiling Information 110A) and a set of message filtering policies (Message Filtering Policies 110B). Referring now to FIG. 1 and FIG. 1A, Personal Record 110 is created and maintained by Subject 120 in the private confines of her own personal device. Subject's 120 device may be any of a wide range of devices, such as a desktop or portable computer, a "smart" cell phone, a personal digital assistant, a television set-top box, game console, etc. Typically, Profiling Information 110A is data that Subject 120 may wish to keep private but is also data that is useful to Message Sponsor 101 for targeting messages to a receptive audience, for example, age, sex, income, zip code, Social Security number, religious and political affiliations, ethnic origin, health information, credit card numbers, insurance and other preferences, hobbies and interests, Internet usage, etc. Message Filtering Policies 110B enable Subject 120 to restrict message delivery. For example, Subject 120 may filter messages by sender and sender category (direct business relationship, marketing affiliate, unaffiliated third party, etc.), message category (personal, advertising, promotional, political, charitable fundraising, etc.), content (recreation, investments, consumer products, etc.), sponsor reputation ratings or other types of aggregate feedback, and the like. Message Filtering Policies 110B may also detail minimum reimbursement for allowing access to data or receiving messages.

Personal Record 110 is created and maintained at the client node, Subject 120, and encrypted before transmittal to the central database facility, Anonymity Service 130, via a secure channel. Specific encryption techniques, digital signing and authentication methods, transport protocols, message exchange protocols (communication sequences), internal data representation, and other such adaptation details are peripheral to the invention and not described herein.

FIG. 1 depicts the system-level interactions between MTFDBS 100 clients and servers. It intentionally simplifies and omits important aspects of Subject's 120 internal organization and operation, which are depicted in greater detail in FIGS. 2-4. Referring to FIG. 1, all operations requiring unencrypted access to Personal Record 110 are delegated to Resident Application 121 residing on Subject's 120 client device. Resident Application 121 may be any of a variety of software applications, or alternatively an extension, plug-in, add-in or other component of any such application, adapted for carrying out the system's distributed operations in a particular client-side software and hardware environment. For example, Resident Application 121 may be a secure private email application running on a desktop computer, a voicemail program running on a "smart" cell phone, a computer game running on a game device connected to a television set, a plug-in extension to an Internet browser running on a wireless personal digital assistant, etc. Resident Application 121 is not itself capable of performing unencrypted database operations; for this it must download various code and data elements including an updated copy of Session Agent 122 to which Resident Application 121 delegates all such operations. Session Agent 122 and its role are described in greater detail in reference to FIGS. 2-4 below.

Operations requiring unencrypted access to the contents of Personal Record 110 are performed by Resident Application 121 only within a secure, isolated region of process memory, referred to herein as Quarantine Memory 123, within an individual Subject's 120 client device, such that unencrypted data cannot be copied outside Subject's 120 direct and immediate control. Thus the only place that Personal Record 110 exists in unencrypted form is on the device of the corresponding Subject 120 and then only in Quarantine Memory 123, not touching storage media or traveling across a wire, for example, where it could be accessed by someone without permission.

Anonymity Service 130 maintains Personal Records Database 133 for storage of Subject's 120 personal data. Personal Records Database 133 is a database system in the widely accepted sense of the term: that is, it provides storage for multiple data records in a common format or "schema," and methods for the creation, modification, deletion, and querying of such records, as well as their conversion ("migration") to a new format if and when the schema changes. Unlike other databases, however, Personal Records Database 133 is fully distributed in design and operation, depending on client-side software agents for all operations requiring unencrypted access to data, such as data record modification, query, and schema migration. In respect to Records Database 133, Anonymity Service 130 is relegated to a subordinate role involving only data-blind functions, such as storage of encrypted data records, schema maintenance, updating of client-side software agents, and distribution of data operations to client nodes.

Referring again to FIG. 1, Anonymity Service 130 may maintain multiple databases in addition to Personal Records Database 133, such as Subject Login Account Database 132, for storing account information; Subject Accounts Payable Database 134, for storing reimbursement credit information; Sponsor Accounts Database 135, for storing sponsor profile and reputation information; Message Store Database 136, for storing Message 150 waiting to be delivered; and Sponsor Accounts Receivable Database 137, for storing delivery debit information. As will be recognized by those in the art, these databases are listed for descriptive purposes and may or may not have this actual configuration; i.e., the databases may be merged or divided in different ways and may or may not all exist.

In one embodiment, one of the roles of Anonymity Service 130 involves overseeing Payments 190 and Collections 191 managed by an External Payment System 103. External Payment System 103 is the mechanism used for collecting payments from Message Sponsor 101 and distributing reimbursements associated with acceptance and delivery of some messages to Subject 120. External Payment System 103 may be a conventional banking network, an on-line payment system, a customer reward or loyalty system, or any other mechanism or combination of mechanisms for transacting debits and credits over a network. The privacy and anonymity of Subject 120 are maintained throughout any payment transactions by the use of anonymous identifiers, etc.

Figure 2:
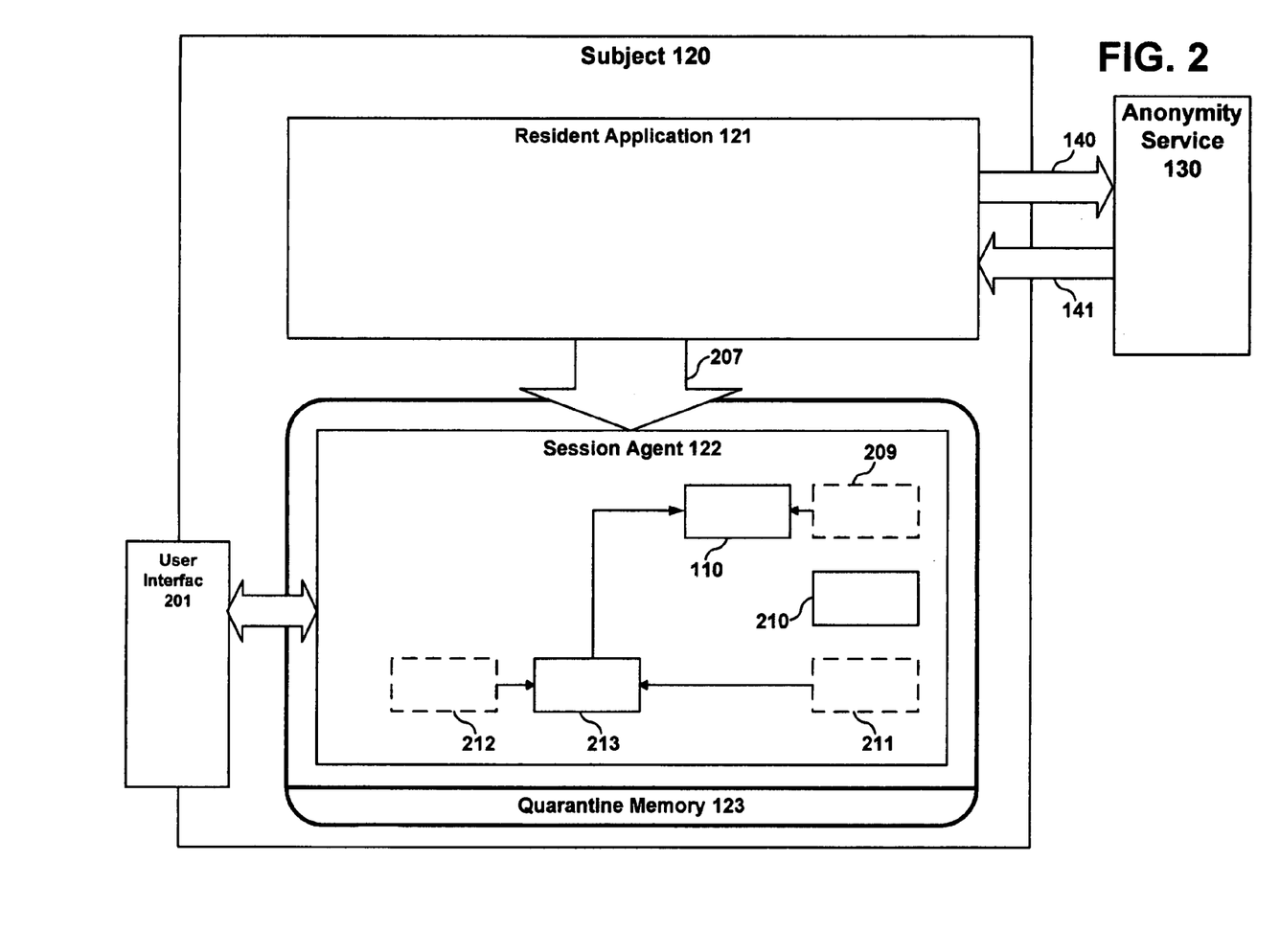
FIG. 2 is a block diagram illustrating acquisition of a client session update during session startup in accordance with one embodiment of the invention.

FIG. 2 is a block diagram illustrating acquisition of a client session update in accordance with one embodiment of the invention. Referring to FIG. 2, Subject 120 initiates a message session via User Interface 201. User Interface 201 may be any of the variety of devices designed for interactive input; i.e., keyboard, mouse, game controller, remote control device, telephone touchtone keys, etc., used in conjunction with some manner of output device; i.e., computer display, television screen, speaker, headphones, etc. The configuration of User Interface 201 depends on Subject's 120 personal device and the functions of Resident Application 121 as described above, but is not limited by the present invention.

In one embodiment, to initiate a message session, Subject 120 may log into the MTFDBS 100 system by interacting with Resident Application 121 via User Interface 201. For example, if Resident Application 121 is an email program, Subject 120 may initiate the login sequence by checking her email. Resident Application 121 contains adapter software which customizes the login sequence as required by the particular capabilities and constraints of Subject's 120 device and its operating system. The login process includes the downloading from Anonymity Service 130 of all code and data elements needed for performing operations on Personal Record 110. Resident Application 121 responds to Subject's 120 login request by sending Session Agent Download Request 140 to Anonymity Service 130.

Anonymity Service 130 authenticates Session Agent Download Request 140 by any of the various methods known to those in the art as mentioned above, and responds by sending Session Agent Download 141. Session Agent Download 141 contains an updated copy of the MTFDBS 100 message session software (Session Agent 122), an encrypted copy of Subject's 120 personal data record (Encrypted PR 209), an encrypted copy of Subject's 120 private encryption key (Encrypted Private Key 211), and a public key (Public Key 210) for encrypting return communications.

Referring still to FIG. 2, in one embodiment Resident Application 121 installs Session Installation 207, which includes Session Agent 122, Encrypted PR 209 and Public Key 210 and Encrypted Private Key 211, in Quarantine Memory 123. Upon Resident Application's 121 request, Session Agent 122 obtains Personal Passphrase 212 from Subject 120, and uses Personal Passphrase 212 to decrypt Encrypted Private Key 211. Session Agent 122 then uses the resulting unencrypted Private Key 213 to decrypt Encrypted PR 209, yielding Personal Record 110 in unencrypted form. At this point Session Agent 122 has full unencrypted access to Personal Record 110 and is ready to handle all data-sensitive responsibilities, such as filtering, receiving and responding to messages from Message Sponsor 101. Public Key 210, Encrypted Private Key 211, and Personal Passphrase 212 may be components of various encryption techniques. Their use in this description is to indicate the level of security necessary to protect the privacy of the data and anonymity of Subject 120. As is understood by those in the art, various encryption techniques may use all, some or none of these components, and the present invention is not limited to a specific encryption technique. In alternative embodiments, a passphrase equivalent may be provided by a "smart card," or a biometric identification method such as thumbprint or retinal scan identification, etc. A central characteristic of all embodiments, however, is the inability of Anonymity Service 130 to access Subject's 120 unencrypted personal data, the decryption of which requires an element kept by Subject 120 under his separate personal control and provided on request, and which cannot be duplicated or transmitted beyond the confines of Quarantine Memory 123.

Figure 3:
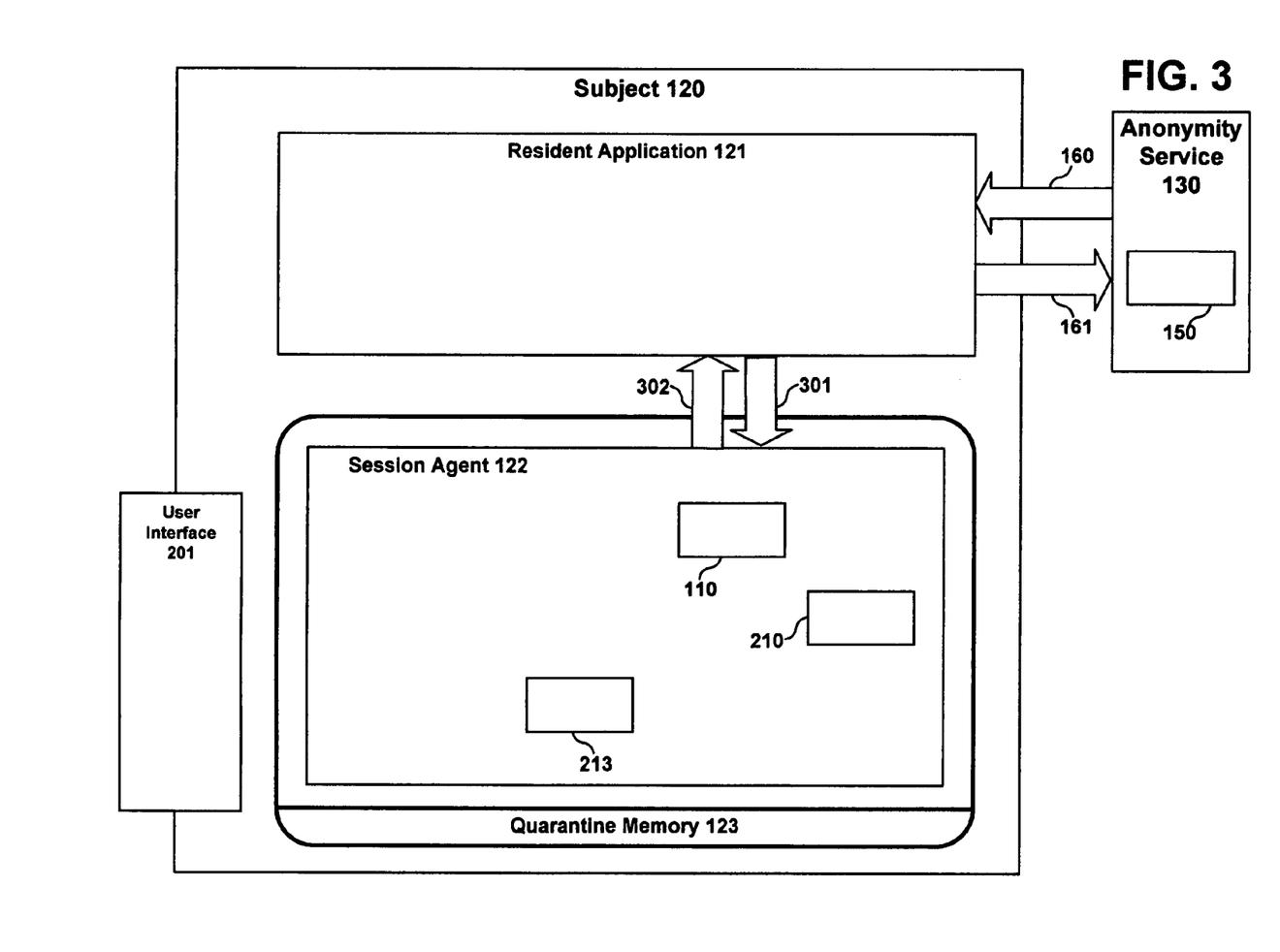
FIG. 3 is a block diagram illustrating the processing of a message permission query in accordance with one embodiment of the invention.

FIG. 3 is a block diagram illustrating the processing of a message permission query in accordance with one embodiment of the invention. Session Agent 122 performs the database functions distributed to the client device including data modification, schema migration, and queries. Continuing with the email example, Anonymity Service 130 may have an email message (Message 150A) from Message Sponsor 101 waiting to be delivered. Anonymity Service 130 sends Message Permission Query 160 to Resident Application 121 notifying Subject 120 that Message 150A is available. Resident Application 121 relays the query to Session Agent 122 as Permission Query 301. Session Agent 122 carries out the requested message permission query in an attempt to obtain a reciprocal match between message and recipient. Permission Query 301 compares 101 Message Targeting Specification 150B with Personal Profile 110A to determine if Subject 120 is an intended recipient, and compares Message Profile 150C with Message Filtering Policies 110B to determine if Subject 120 is willing to accept the message. Given a positive match, Session Agent 122 may additionally interact with Subject 120 via User Interface 201 to confirm her willingness to accept Message 150A.

Session Agent 122 returns the results of the database query to Resident Application 121 in Permission Query Result 302. Resident Application 121 relays the information in Permission Query Result 302 to Anonymity Service 130 as Message Permission Query Result 161.

The message permission query illustrated in FIG. 3 is one of many database operations delegated to client nodes. Other such distributed operations may include data modification, schema migration, other types of queries, etc. Session Agent 122 may perform a generic database query that does not result in message delivery, such as a polling query or request for demographic information which requires access to Personal Record 110 but does not require the delivery of a message. Other capabilities of Session Agent 122 include schema migration of the data in Personal Record 110 in response to a change in data format requested by Anonymity Service 130, and allowing Subject 120 to modify the data in Personal Record 110 using User Interface 201.

Figure 4:
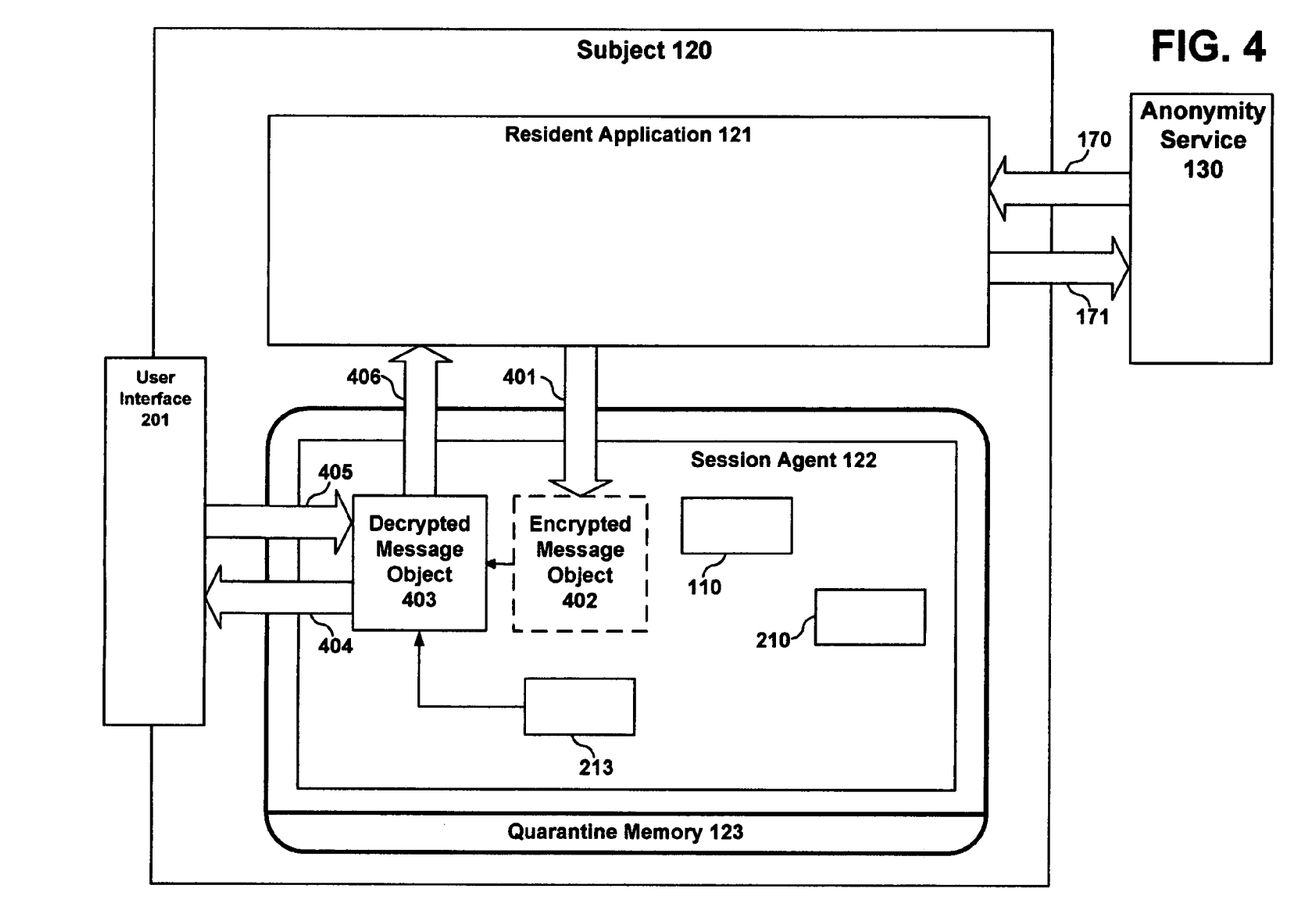
FIG. 4 is a block diagram illustrating message delivery and confirmation in accordance with one embodiment of the invention.

Refer now to FIG. 4 which is a block diagram illustrating message delivery and confirmation in accordance with one embodiment of the invention. Having received permission to deliver the message, Anonymity Service 130 sends Message Delivery 170 to Resident Application 121. Each of the transmissions between Anonymity Service 13Q and Resident Application 121 are sent with various levels of encryption to protect the privacy of the data and the anonymity of Subject 120. Thus Message Delivery 170 consists of Message Object Installation 401 which installs Encrypted Message Object 402 in Quarantine Memory 123 for processing by Session Agent 122.

In one embodiment, Session Agent 122 uses Private Key 213 to convert Encrypted Message Object 402 into Message Object 403. Message Object 403 may be an email message, a bitmap image intended for display within an interactive game session, a cellular telephone message, an Internet survey, etc. Session Agent 122 communicates with Subject 120 via User Interface 201, sending Message Output 404 and receiving Interactive Input 405. The communication is determined by the character of Resident Application 121, i.e., email, voicemail, game, etc., and by Message Object 403, and by Interactive Input 405 from Subject 120. After Session Agent 122 delivers the message, Subject 120 determines whether or not to "consume" the message, i.e., an email message delivered to a mailbox can still be deleted without being read. Message Object 403 may require interaction with Subject 120 to verify that the message has been consumed. Session Agent 122 compiles message delivery information, verification of message consumption if required, and reputation feedback on Message Sponsor 101 from Subject 120, creating Delivery Confirmation 406. Session Agent 122 transmits Delivery Confirmation 406 to Resident Application 121. Resident Application 121 relays the information to Anonymity Service 130 as Delivery Acknowledgement 171. When Subject 120 ends the client session, everything in Quarantine Memory 123 is deleted.

Accordingly, a method and apparatus for a message targeting and filtering database system are described. From the foregoing description, those skilled in the art will recognize that many other variations of the invention are possible. Some of these variations have been discussed above but others may exist. Thus, the invention is not limited by the details described. Instead, the invention can be practiced with modifications and alterations within the spirit and scope of the appended claims.

I claim:

1. A secure messaging system comprising:
   a personal record comprising a personal profile about a subject and a message filtering policy determined by the subject;
   an anonymity service, the anonymity service being an intermediary between the subject and a message sponsor, the message sponsor desiring to send a message to the subject based on the personal record;
   a message deposit sent to the anonymity service by the message sponsor wherein the message deposit comprises the message, a message targeting specification, and a message profile;
   a database maintained by the anonymity service, the personal record being stored in the database in an encrypted state, the anonymity service having an access to the personal record only in the encrypted state;

a resident application residing on a client device under control of the subject, the resident application managing access to the personal record in an unencrypted state by use of a security element including an encrypted private key;

a quarantine memory, the quarantine memory being a secure area of system memory on the client device; and a session agent configured to perform a database operation on the personal record in the unencrypted state in the quarantine memory, wherein the resident application, the quarantine memory and the session agent all reside on the client device under control of the subject, and wherein the resident application, the quarantine memory and the session agent collectively secure the personal record and the private key in an unencrypted state against access by the anonymity service.

2. The system of claim 1 wherein the database operation comprises:
   a database query which compares the message profile to the message filtering policy; and
   a database query which compares the personal profile to the message targeting specification.

3. The system of claim 1 further comprising:
   a query result sent to the anonymity service from the resident application;
   a message delivery sent from the anonymity service to the resident application; and
   a delivery confirmation sent from the resident application to the anonymity service.

4. The system of claim 1 wherein the database operation comprises a data record modification.

5. The system of claim 1 wherein the database operation comprises a schema migration.

6. The system of claim 1 further comprising a delivery notification sent from the anonymity service to the sponsor wherein the delivery notification comprises:
   an anonymous proof of delivery;
   an anonymous response from the subject; and
   an anonymous payment record.

7. The system of claim 2 further comprising an interactive response from the subject.

8. The system of claim 1 wherein the quarantine memory at least temporarily contains the personal record in an unencrypted state and a private key also in an unencrypted state.

9. A secure messaging method comprising:
   maintaining a personal record belonging to a subject in a centralized database in an encrypted form, the personal record comprising a personal profile and a message filtering policy;
   distributing a database operation from the centralized database to a client device, wherein the database operation is performed on the personal record in an unencrypted form in a quarantine memory at the client device by use of a security element including an encrypted private key securely maintained by and accessible only to the subject such that the encrypted private key is inaccessible to the anonymity service, and wherein distributing the database operation from the centralized database to the client device comprises:
      downloading a session agent by a resident application, the resident application being resident on the client device, the session agent comprising a software update, the personal record, and the security element including the encrypted private key, and
      performing a database query by the session agent on the personal record in an unencrypted form; and
   establishing an intermediary between the subject and a message sponsor for the purpose of allowing the message sponsor to send a message to the subject based on the personal profile while maintaining an anonymity of the subject.

10. The method of claim 9 wherein the client device comprises a device capable of sending and receiving a signal over a digital network, the client device being under a physical control of the subject.

11. The method of claim 9 wherein establishing the intermediary between the subject and the message sponsor comprises:
   receiving a message deposit from the message sponsor, the message deposit comprising a message, a message targeting specification, and a message profile;
   negotiating permission to deliver the message to the subject;
   delivering the message to the subject;
   receiving a delivery confirmation from the subject; and
   sending the delivery confirmation to the message sponsor while maintaining an anonymity of the subject.

12. The method of claim 11 wherein negotiating permission to deliver the message comprises:
   performing a targeting database query wherein the message targeting specification is compared to the personal profile; and
   performing a filtering database query wherein the message filtering policy is compared to the message profile.

13. The method of claim 11 further comprising:
   accounting for a message charge to the message sponsor;
   accounting for a message credit to the subject;
   communicating the message charge to an external payment system; and
   communicating the message credit to an external payment system.

14. Storage media comprising instructions that, when executed by a machine, cause the machine to:
   maintain a personal record belonging to a subject in a centralized database in an encrypted form, the personal record comprising a personal profile and a message filtering policy;
   distribute a database operation from the centralized database to a client device, wherein the database operation is performed on the personal record in an unencrypted form in a quarantine memory at the client device by use of a security element including an encrypted private key securely maintained by and accessible only to the subject such that the encrypted private key is inaccessible to all others, and wherein causing the machine to distribute the database operation from the centralized database to the client device comprises causing the machine to:
      download a session agent by a resident application, the resident application being resident on the client device, the session agent comprising a software update, the personal record, and the security element including the encrypted private key, and
      perform a database query by the session agent on the personal record in an unencrypted form; and
   establish an intermediary between the subject and a message sponsor for the purpose of allowing the message sponsor to send a message to the subject based on the personal profile while maintaining an anonymity of the subject.

15. The storage media of claim 14 wherein the client device comprises:
a device capable of sending and receiving a signal over a digital network, the client device being under a physical control of the subject.

16. The storage media of claim 14 wherein causing the machine to establish the intermediary between the subject and the message sponsor comprises causing the machine to:
receive a message deposit from the message sponsor, the message deposit comprising a message, a message targeting specification, and a message profile;
negotiate permission to deliver the message to the subject;
deliver the message to the subject;
receive a delivery confirmation from the subject; and
send the delivery confirmation to the message sponsor while maintaining an anonymity of the subject.

17. The storage media of claim 16 wherein causing the machine to negotiate permission to deliver the message comprises causing the machine to:
perform a targeting database query wherein the message targeting specification is compared to the personal profile; and
perform a filtering database query wherein the message filtering policy is compared to the message profile.

18. The storage media of claim 16 further comprising causing the machine to:
account for a message charge to the message sponsor;
account for a message credit to the subject;
communicate the message charge to an external payment system; and
communicate the message credit to an external payment system.

19. The system of claim 8, wherein the quarantine memory contents including the personal record and the private key are deleted at an end of a client session.

* * * * *